(12) United States Patent
Han et al.

(10) Patent No.: US 8,730,892 B2
(45) Date of Patent: May 20, 2014

(54) METHOD AND DEVICE FOR SCHEDULING TERMINALS

(75) Inventors: Xiaojiang Han, Guangdong Province (CN); Gang Zhao, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 421 days.

(21) Appl. No.: 13/257,990

(22) PCT Filed: May 13, 2010

(86) PCT No.: PCT/CN2010/072723
§ 371 (c)(1),
(2), (4) Date: Nov. 9, 2011

(87) PCT Pub. No.: WO2010/133147
PCT Pub. Date: Nov. 25, 2010

(65) Prior Publication Data
US 2012/0051304 A1 Mar. 1, 2012

(30) Foreign Application Priority Data

May 19, 2009 (CN) .......................... 2009 1 0107438

(51) Int. Cl.
*H04W 4/00* (2009.01)
(52) U.S. Cl.
USPC ........................................................ 370/329
(58) Field of Classification Search
None
See application file for complete search history.

(56) References Cited

U.S. PATENT DOCUMENTS

| 2010/0113055 A1* | 5/2010 | Iwamura et al. | 455/452.1 |
| 2010/0309803 A1* | 12/2010 | Toh et al. | 370/252 |
| 2011/0009117 A1* | 1/2011 | Breuer et al. | 455/434 |
| 2011/0092201 A1* | 4/2011 | Lindstrom et al. | 455/424 |

FOREIGN PATENT DOCUMENTS

| CN | 101043713 A | 9/2007 |
| CN | 101335975 A | 12/2008 |
| CN | 101352091 A | 1/2009 |

(Continued)

OTHER PUBLICATIONS

3GPP TS 36.300 V8.3.0, Evolved Universal Terrestrial Radio Access (E-UTRA) and Evolved Universal Terrestrial Radio Access Network (E-UTRAN), Release 8, Dec. 2007.

(Continued)

*Primary Examiner* — Chirag Shah
*Assistant Examiner* — Amar Persaud
(74) *Attorney, Agent, or Firm* — Ling Wu; Stephen Yang; Ling and Yang Intellectual Property

(57) ABSTRACT

The present invention discloses a method and device for scheduling terminals based on the measurement gap. The method comprises: when the system side needs to schedule a terminal in a measurement state of measurement gap, not only judging whether the downlink scheduling information or the uplink authorization information of the terminal is sent during the period of measuring the measurement gap, but also judging whether the downlink scheduling feedback, the uplink data feedback or the uplink data corresponding to the uplink authorization is sent during the period of measuring the measurement gap, and scheduling the terminal normally when none of the above information is sent during the period of measuring the measurement gap; the device comprises a judging module, a scheduling module and a terminal information acquisition module. The present invention can simplify the processing for the terminal and save the resources of the system.

14 Claims, 2 Drawing Sheets

(56) References Cited

FOREIGN PATENT DOCUMENTS

| WO | 2008070589 A2 | 6/2008 |
|---|---|---|
| WO | 2008105419 A1 | 9/2008 |
| WO | 2008108222 A1 | 9/2008 |

OTHER PUBLICATIONS

Huawei, Measurement Gap scheduling in HO procedure in LTE, 3GPP TSG RAN2#52, Tdoc R2-060860, Mar. 27-31, 2006.
International Search Report for PCT/CN2010/072723 dated Jul. 12, 2010.

* cited by examiner

METHOD AND DEVICE FOR SCHEDULING TERMINALS

TECHNICAL FIELD

The present invention relates to the field of Long Term Evolution (LTE) system, and in particular, to a method and device for scheduling terminals.

BACKGROUND OF THE RELATED ART

In wireless cellular communication system, the system side sends information which is completely the same for all the configuration of terminals in the cell by broadcasting messages, saving wireless resources, and terminals may obtain sufficient access information to set up a wireless connection with network by messages broadcasted by system.

In the third generation mobile communication LTE system, the starting location, the period and gap of the measurement gap are configured by RRC (Radio Resource Control) layer. The terminal finishes the measurement according to the configured measurement period. During the period of measuring the measurement gap, terminals can't communicate with the system side, i.e. during measurement gap, communication stops.

For downlink processing based on the measurement gap, it's only defined that the transmission of downlink data can't conflict with the measurement gap when scheduling data. For uplink feedback, terminals do not give any feedback during measurement gap. When terminals adopt non-adaptive retransmission, the system side continues retransmission according to the result of no feedback from the terminals, i.e. during the period of measuring the measurement gap, it is impossible for terminals to receive data and give feedback, therefore, this may cause an out-of-step between tasks of system side and terminals, meanwhile increasing the resource overhead for scheduling ineffectively, reducing the performance of system.

SUMMARY OF THE INVENTION

The present invention is to provide a method and device for scheduling terminals, in order to solve the technical problems. The present invention saves the resources of the system effectively.

The present invention provides a method for scheduling terminals, comprising:

when system side needs to schedule a terminal in a measurement state of measurement gap, executing the following steps of:

step 1: judging whether downlink scheduling information or uplink authorization information of the terminal is sent during the period of measuring the measurement gap; if yes, the terminal being not scheduled now; if no, step 2 being executed; and step 2: judging whether downlink scheduling feedback, uplink data feedback or uplink data corresponding to uplink authorization of the terminal is sent during the period of measuring the measurement gap; if yes, the terminal being not scheduled now; if no, the terminal being scheduled normally.

In the step 1, the step of judging whether downlink scheduling information or uplink authorization information of the terminal is sent during the period of measuring the measurement gap is any one of the following three judgments: I, merely judging whether the downlink scheduling information of the terminal is sent during the period of measuring the measurement gap; II, merely judging whether the uplink authorization information of the terminal is sent during the period of measuring the measurement gap; and III, judging whether either of the following information is sent during the period of measuring the measurement gap: the downlink scheduling information of the terminal, the uplink authorization information of the terminal.

When the judgment I is executed in the step 1, the step 2 comprises: judging whether the downlink scheduling feedback of the terminal is sent during the period of measuring the measurement gap, if yes, the terminal is not scheduled now; if no, the terminal is scheduled normally; or When the judgment II is executed in the step 1, the step 2 comprises: judging whether either of the following information is sent during the period of measuring the measurement gap: the uplink data feedback of the terminal, the uplink data corresponding to the uplink authorization of the terminal, if yes, the terminal is not scheduled now; if no, the terminal is scheduled normally; or When the judgment III is executed in the step 1, the step 2 comprises: judging whether any of the following information is sent during the period of measuring the measurement gap: the downlink scheduling feedback of the terminal, the uplink data feedback of the terminal, the uplink data corresponding to the uplink authorization of the terminal, if yes, the terminal is not scheduled now; if no, the terminal is scheduled normally.

In the method, the step of judging whether the downlink scheduling information of the terminal is sent during the period of measuring the measurement gap comprises: the system side judging whether the downlink scheduling information of the terminal is sent during the period of measuring the measurement gap according to configuration of the measurement gap of the terminal; the step of judging whether the uplink authorization information of the terminal is sent during the period of measuring the measurement gap comprises: the system side judging whether the uplink authorization information of the terminal is sent during the period of measuring the measurement gap according to the configuration of the measurement gap of the terminal.

In the method, the step of judging whether the uplink data feedback of the terminal is sent during the period of measuring the measurement gap comprises: the system side judging whether the uplink data feedback of the terminal is sent during the period of measuring the measurement gap according to transmitting and processing delay of the terminal; the step of judging whether the uplink data corresponding to the uplink authorization of the terminal is sent during the period of measuring the measurement gap comprises: the system side judging whether the uplink data corresponding to the uplink authorization of the terminal is sent during the period of measuring the measurement gap according to configuration of the measurement gap of the terminal; the step of judging whether the downlink scheduling feedback of the terminal is sent during the period of measuring the measurement gap comprises: the system side judging whether the downlink scheduling feedback of the terminal is sent during the period of measuring the measurement gap according to transmitting and processing delay of the terminal.

The method further comprises executing the following operations before the system side schedules the terminal:

step a: acquiring information of the terminal which needs to be scheduled on current sub-frame, scheduling the terminal according to a scheduling policy;

step b: judging whether the terminal is in measurement state currently according to the acquired information, if yes, step c being executed; if no, the terminal being scheduled directly;

step c: judging whether the current measurement of the terminal is the measurement gap, if yes, step 1 being executed; if no, the terminal being scheduled directly.

After the terminal has been scheduled, the method further comprises: the system side judging whether terminals which need to be scheduled on the current sub-frame have been scheduled, if yes, processing for the current sub-frame being finished; if no, proceeding to schedule the next terminal, step a being executed.

In the method, the scheduling the terminal refers to scheduling the terminal in downlink or authorizing the terminal in uplink.

To solve the above technical problem, the present invention also provides a device for scheduling terminals, located on the system side, the device comprising: a judging module and a scheduling module, wherein:

the judging module is configured to judge whether downlink scheduling information or uplink authorization information of a terminal in a measurement state of measurement gap is sent during the period of measuring the measurement gap, and to judge whether downlink scheduling feedback, uplink data feedback or uplink data corresponding to uplink authorization of the terminal is sent during the period of measuring the measurement gap; and to transfer the judgment result to the scheduling module;

the scheduling module is configured to schedule the terminal of which none of the following information is sent during the period of measuring the measurement gap according to the judgment result of the judging module: the downlink scheduling information, the uplink authorization information, the downlink scheduling feedback, the uplink data feedback, the uplink data corresponding to the uplink authorization.

The device further comprises a terminal information acquisition module configured to acquire information of the terminal which needs to be scheduled on current sub-frame.

In the device, the judging module is also configured to judge whether the terminal which needs to be scheduled is in a measurement state according to the information of the terminal acquired by the terminal information acquisition module; and to judge whether the current measurement of the terminal is the measurement gap when the terminal is in the measurement state.

The judging module is also configured to judge whether terminals which need to be scheduled on current sub-frame have been scheduled according to the information of the terminals acquired by the terminal information acquisition module; the scheduling module is also configured to schedule directly the terminal which is in the measurement state but the current measurement is not the measurement gap, and the terminal which is not in the measurement state.

In the device, the judging module is configured:

to further judge whether the downlink scheduling information is sent during the period of measuring the measurement gap when judging there is the downlink scheduling information of the terminal, and if yes, not to schedule the terminal now; if no, to further judge whether the downlink scheduling feedback of the terminal is sent during the period of measuring the measurement gap, and if yes, not to schedule the terminal now; if no, to schedule the terminal normally; or to further judge whether the uplink authorization information is sent during the period of measuring the measurement gap when judging there is the uplink authorization information of the terminal, and if yes, not to schedule the terminal now; if no, to further judge whether either of the following information is sent during the period of measuring the measurement gap: the uplink data feedback of the terminal, the uplink data corresponding to the uplink authorization of the terminal, and if yes, not to schedule the terminal now; if no, to schedule the terminal normally; or to further judge whether either of the downlink scheduling information or the uplink authorization information of the terminal is sent during the period of measuring the measurement gap when judging there is the downlink scheduling information and the uplink authorization information of the terminal, and if yes, not to schedule the terminal now; if no, to judge whether any of the following information is sent during the period of measuring the measurement gap: the downlink scheduling feedback of the terminal, the uplink data feedback of the terminal, the uplink data corresponding to the uplink authorization of the terminal, and if yes, not to schedule the terminal now; if no, to schedule the terminal normally.

Optimizing operation is proposed for the measurement gap in the present invention, i.e. when the system side is scheduling the terminal in the measurement state of the measurement gap, it not only judges whether the downlink scheduling information or uplink authorization information of the terminal is sent during the measurement of gap, but also judges whether the downlink scheduling feedback, uplink data feedback or uplink data corresponding to the uplink authorization of the terminal is sent during the period of measuring the measurement gap, and when none of the above information is sent during the period of measuring the measurement gap, the system side will schedule the terminal normally, so that it is simple to process the terminal, and for the system side, it avoids the failure to transmit data due to no feedback from the terminal configured with the measurement gap, thus saving resources of the system.

PREFERRED EMBODIMENTS OF THE PRESENT INVENTION

In conjunction with drawings and preferred examples below, the present invention is further illustrated in detail.

Figure 1:
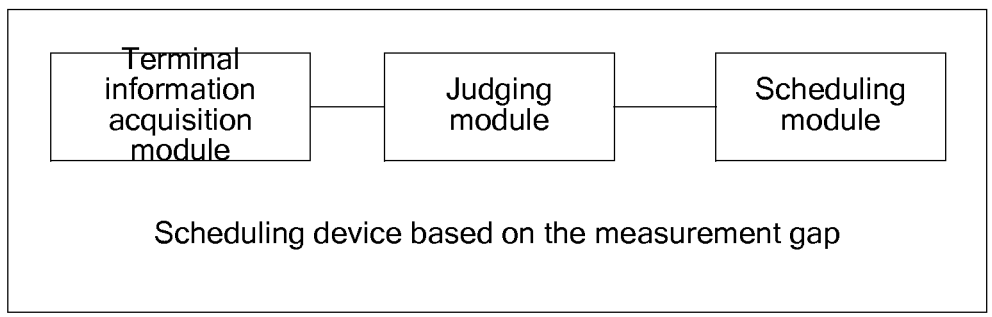
FIG. 1 is a block diagram of structure of the device in the present invention.

As shown in FIG. 1, it is a block diagram of structure of said device in the present invention; including a terminal information acquisition module, a judging module and a scheduling module, wherein, the terminal information acquisition module is used to acquire the terminal information which needs to be scheduled on current sub-frame;

the judging module is used to judge whether a terminal which needs to be scheduled is in measurement state according to the terminal information acquired by said terminal information acquisition module; and to judge whether the current measurement of said terminal is the measurement gap when the terminal is in measurement state; to judge whether the downlink scheduling information or uplink authorization information of the terminal in the measurement state of the measurement gap is sent during the period of measuring the measurement gap, and to judge whether the downlink scheduling feedback, uplink data feedback or uplink data corresponding to uplink authorization of said terminal is sent during measurement gap; to judge whether the terminal which needs to be scheduled on current sub-frame has been scheduled; to transfer the judgment result to said scheduling module; the judging module judges whether the downlink scheduling information, uplink authorization information or uplink data corresponding to uplink authorization of said terminal is sent during the period of measuring the measurement gap according to the configuration of the measurement gap of the terminal, and above-described configuration of the measurement gap comprises the starting location, the period and the gap of measurement, and sent by said system side; to judge whether the downlink scheduling feedback or uplink data feedback is sent during the period of measuring the measurement gap according to transmitting and processing delay of the terminal;

said scheduling module is used to schedule the corresponding terminal according to the judgment result transferred by the judging module, and if the terminal is not in the measurement state, or it's in the measurement state, but current measurement is not the measurement gap, then it's scheduled directly; if the terminal is in the measurement gap state, but none of the downlink scheduling information or uplink authorization information, downlink scheduling feedback, uplink data feedback or uplink data corresponding to uplink authorization thereof is sent during the period of measuring the measurement gap, the terminal is scheduled; otherwise, the terminal is not scheduled.

Figure 2:
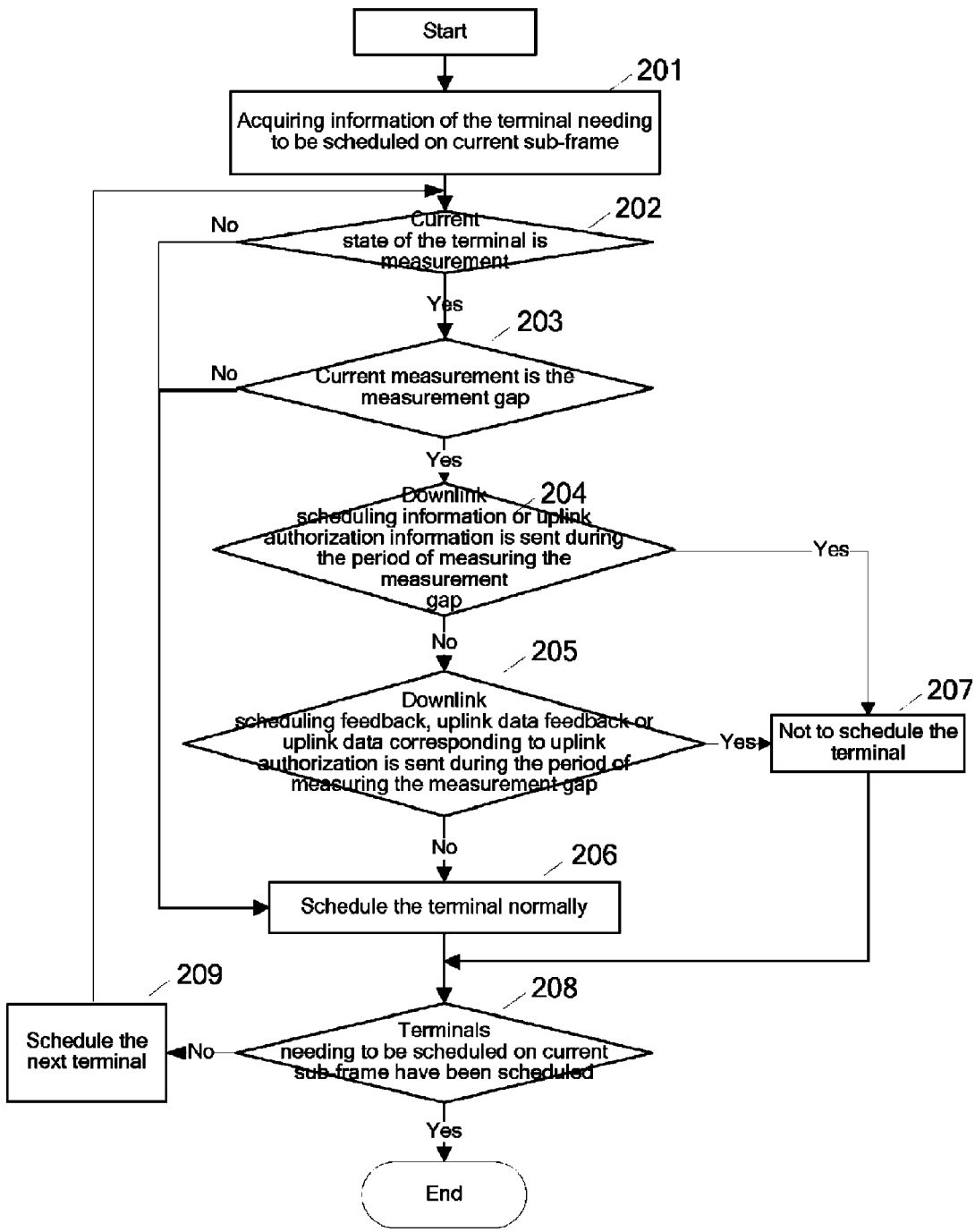
FIG. 2 is a flow chart of the method in the present invention.

As shown in FIG. 2, it is a flow chart of said method in the present invention; including the following steps:

Step 201: the system side acquires the information of the terminal which needs to be scheduled on current sub-frame, and schedules said terminal according to a scheduling policy;

said information of the terminal acquired herein is mainly for judging whether the terminal is in the measurement state currently, therefore, the information acquired herein mainly refers to state information of the terminal.

The scheduling policy may be a priority scheduling policy or other policies.

Step 202: judging whether the terminal is in the measurement state currently according to the acquired information, if yes, step 203 is executed; otherwise, step 206 is executed.

Step 203: judging whether the current measurement of said terminal is the measurement gap, if yes, step 204 is executed; otherwise, step 206 is executed.

In other examples, above-described step 202 and step 203 may be combined into one step, i.e. judging whether the terminal is in the measurement gap state currently, if yes, subsequent judging steps are proceeded to, otherwise said terminal is scheduled normally.

Step 204: judging whether the downlink scheduling information or uplink authorization information of said terminal is sent during the period of measuring the measurement gap, if yes, step 207 is executed; otherwise, step 205 is executed;

Step 205: judging whether the downlink scheduling feedback, uplink data feedback or uplink data corresponding to uplink authorization of said terminal is sent during the period of measuring the measurement gap, if yes, step 207 is executed; otherwise, step 206 is executed;

the system side judges whether the downlink scheduling information, uplink authorization information or uplink data corresponding to uplink authorization of said terminal is sent during the period of measuring the measurement gap according to the configuration of the measurement gap of the terminal, and the configuration of the measurement gap of the terminal comprises the starting location, the period and the measurement gap, and sent by said system side, for the specific method, please refer to the configuration of the measurement gap in 36.331 protocol; the system side judges whether the downlink scheduling feedback or uplink data feedback of said terminal is sent during the period of measuring the measurement gap according to transmitting and processing delay of said terminal, and the transmitting and processing delay of the terminal in Frequency Division Duplex (FDD) mode in the current LTE system is 4 ms; while in Time Division Duplex mode, the transmitting and processing delay of the terminal are different for different configurations, TS36.211 protocol can be referred to for details.

In above step 204, said judgment of whether the downlink scheduling information or uplink authorization information of said terminal being sent during the period of measuring the measurement gap, is any of the following three judgments:

1) merely judging whether the downlink scheduling information of said terminal is sent during the period of measuring the measurement gap;

2) merely judging whether the uplink authorization information of said terminal is sent during the period of measuring the measurement gap;

3) judging whether either of the following information is sent during the period of measuring the measurement gap: the downlink scheduling information of said terminal, the uplink authorization information of said terminal;

When judgment 1) is executed in step 204, the judgment executed in step 205 is:

judging whether downlink scheduling feedback of said terminal is sent during the period of measuring the measurement gap, if yes, step 207 is executed; otherwise, step 206 is executed.

When judgment 2) is executed in step 204, the judgment executed in step 205 is:

judging whether either of the following information is sent during the period of measuring the measurement gap: uplink data feedback of said terminal, uplink data corresponding to uplink authorization of said terminal, if yes, step 207 is executed; otherwise, step 206 is executed.

When judgment 3) is executed in step 204, the judgment executed in step 205 is:

judging whether any of the following information is sent during the period of measuring the measurement gap: downlink scheduling feedback of said terminal, uplink data feedback of said terminal, uplink data corresponding to uplink authorization of said terminal, if yes, step 207 is executed; otherwise, step 206 is executed.

The prerequisite of executing step 204 is that there is the downlink scheduling information or uplink authorization information of the terminal, and if none, there is no need to execute the judgment of step 204. In short, in the prerequisite that there is downlink scheduling information, uplink authorization information, downlink scheduling feedback, uplink data feedback or uplink data corresponding to uplink authorization, if any of the above information is possibly sent during the period of measuring the measurement gap (it is sent by a base station or a terminal), said base station doesn't schedule the terminal.

Step 206: scheduling said terminal normally, i.e. said terminal is scheduled in downlink or authorized in uplink, and step 208 is executed;

Step 207: said terminal is not scheduled;

Step 208: judging whether the terminal which needs to, be scheduled on current sub-frame has been scheduled, if yes, the processing of current sub-frame is finished; otherwise, step 209 is executed;

in other examples, after the terminal which needs to be scheduled on current sub-frame has been scheduled, it may jump to the next sub-frame for processing.

Step 209: it proceeds to schedule the next terminal of the current sub-frame, and step 202 is executed.

According to above method, suppose that there are totally 50 sub-frames (numbered as: 1-50) in system, and there are 5 terminals (numbered as: 1-5) which need to be scheduled on each sub-frame, wherein terminal 2 is configured with the measurement gap, and the starting location of the measurement gap is the tenth sub-frame, the period being 6 sub-frames, the measurement gap being 25 sub-frames, transmitting and processing delay being 4 ms, the remaining terminals being not configured with the measurement gap, and for the terminal without the configuration of the measurement gap, it is directly scheduled on any sub-frame, while for terminal 2, according to configuration, which implements the measurement gap on sub-frames of 10, 11, 12, 13, 14, 15, 41, 42, 43, 44, 45, 46, i.e. on sub-frames of 10, 11, 12, 13, 14, 15, 41, 42, 43, 44, 45, 46, whether terminal 2 is scheduled depends on the judgment results of step 204 and 205, if none of downlink scheduling information, uplink authorization information, downlink scheduling feedback, uplink data feedback or uplink data corresponding to uplink authorization is sent during the period of measuring the measurement gap, terminal 2 will be scheduled, otherwise, terminal 2 is not scheduled, while on other sub-frames, terminal 2 is scheduled directly.

The above described is merely preferred examples of the present invention, not intent to limit the present invention, and for the person skilled in the art, various modifications and changes may be made to the present invention. Any changes, equivalent replacements, improvements etc. made within the spirit and principle of the present invention are all included in the protection scope of the present invention.

Industrial Applicability

Optimizing operation is proposed for the measurement gap in the present invention, i.e. when the system side schedules the terminal in the measurement state of the measurement gap, it not only judges whether the downlink scheduling information or uplink authorization information of the terminal is sent during the period of measuring the measurement gap, but also judges whether the downlink scheduling feedback, uplink data feedback or uplink data corresponding to uplink authorization of the terminal is sent during the period of measuring the measurement gap, and when none of the above information is sent during the period of measuring the measurement gap, the system side will schedule the terminal normally, so that it is simple to process the terminal, and for the system side, it avoids the failure to transmit data due to no feedback from the terminal configured with the measurement gap, thus saving resources of the system.

What is claimed is:

1. A method for scheduling terminals in a LTE system, comprising:
when a scheduling device on system side needs to schedule a terminal in a measurement state of measurement gap, executing the following steps based on information acquired from the terminal:
step 1: judging whether downlink scheduling information or uplink authorization information of said terminal is sent during a period of measuring the measurement gap; if yes, said terminal being not scheduled now; if no, step 2 being executed; and
step 2: judging whether downlink scheduling feedback, uplink data feedback or uplink data corresponding to uplink authorization of said terminal is sent during the period of measuring the measurement gap; if yes, said terminal being not scheduled now; if no, said terminal being scheduled normally;

wherein, said step of judging whether the uplink data feedback of the terminal is sent during the period of measuring the measurement gap comprises: the system side judging whether the uplink data feedback of said terminal is sent during the period of measuring the measurement gap according to transmitting and processing delay of said terminal;
said step of judging whether the uplink data corresponding to the uplink authorization of said terminal is sent during the period of measuring the measurement gap comprises: the system side judging whether the uplink data corresponding to the uplink authorization of said terminal is sent during the period of measuring the measurement gap according to configuration of the measurement gap of said terminal;
said step of judging whether the downlink scheduling feedback of the terminal is sent during the period of measuring the measurement gap comprises: the system side judging whether the downlink scheduling feedback of said terminal is sent during the period of measuring the measurement gap according to transmitting and processing delay of said terminal.

2. The method of claim 1, wherein:
in said step 1, said step of judging whether downlink scheduling information or uplink authorization information of said terminal is sent during the period of measuring the measurement gap is any one of the following three judgments:
I, merely judging whether the downlink scheduling information of said terminal is sent during the period of measuring the measurement gap;
II, merely judging whether the uplink authorization information of said terminal is sent during the period of measuring the measurement gap; and
III, judging whether either of the following information is sent during the period of measuring the measurement gap: the downlink scheduling information of said terminal, the uplink authorization information of said terminal.

3. The method of claim 2, wherein:
when the judgment I is executed in said step 1, said step 2 comprises: judging whether the downlink scheduling feedback of said terminal is sent during the period of measuring the measurement gap, if yes, said terminal is not scheduled now; if no, said terminal is scheduled normally; or
when the judgment II is executed in said step 1, said step 2 comprises: judging whether either of the following information is sent during the period of measuring the measurement gap:
the uplink data feedback of said terminal, the uplink data corresponding to the uplink authorization of said terminal, if yes, said terminal is not scheduled now; if no, said terminal is scheduled normally; or
when the judgment III is executed in said step 1, said step 2 comprises: judging whether any of the following information is sent during the period of measuring the measurement gap: the downlink scheduling feedback of said terminal, the uplink data feedback of said terminal, the uplink data corresponding to the uplink authorization of said terminal, if yes, said terminal is not scheduled now; if no, said terminal is scheduled normally.

4. The method of claim 3, wherein:
said step of judging whether the uplink data feedback of the terminal is sent during the period of measuring the measurement gap comprises: the system side judging whether the uplink data feedback of said terminal is sent during the period of measuring the measurement gap according to transmitting and processing delay of said terminal;

said step of judging whether the uplink data corresponding to the uplink authorization of said terminal is sent during the period of measuring the measurement gap comprises: the system side judging whether the uplink data corresponding to the uplink authorization of said terminal is sent during the period of measuring the measurement gap according to configuration of the measurement gap of said terminal;

said step of judging whether the downlink scheduling feedback of the terminal is sent during the period of measuring the measurement gap comprises: the system side judging whether the downlink scheduling feedback of said terminal is sent during the period of measuring the measurement gap according to transmitting and processing delay of said terminal.

5. The method of claim 2, wherein:

said step of judging whether the downlink scheduling information of said terminal is sent during the period of measuring the measurement gap comprises: the system side judging whether the downlink scheduling information of said terminal is sent during the period of measuring the measurement gap according to configuration of the measurement gap of said terminal;

said step of judging whether the uplink authorization information of said terminal is sent during the period of measuring the measurement gap comprises: the system side judging whether the uplink authorization information of said terminal is sent during the period of measuring the measurement gap according to the configuration of the measurement gap of said terminal.

6. The method of claim 1, wherein:

said step of judging whether the downlink scheduling information of said terminal is sent during the period of measuring the measurement gap comprises: the system side judging whether the downlink scheduling information of said terminal is sent during the period of measuring the measurement gap according to configuration of the measurement gap of said terminal;

said step of judging whether the uplink authorization information of said terminal is sent during the period of measuring the measurement gap comprises: the system side judging whether the uplink authorization information of said terminal is sent during the period of measuring the measurement gap according to the configuration of the measurement gap of said terminal.

7. The method of claim 1, further comprising executing the following operations before said system side schedules said terminal:

step a: acquiring information of the terminal which needs to be scheduled on current sub-frame, scheduling said terminal according to a scheduling policy;

step b: judging whether the terminal is in measurement state currently according to the acquired information, if yes, step c being executed; if no, said terminal being scheduled directly;

step c: judging whether the current measurement of said terminal is the measurement gap, if yes, step 1 being executed; if no, said terminal being scheduled directly.

8. The method of claim 7, wherein:

after said terminal has been scheduled, said method further comprises: the system side judging whether terminals which need to be scheduled on the current sub-frame have been scheduled, if yes, processing for the current sub-frame being finished; if no, proceeding to schedule the next terminal, step a being executed.

9. The method of claim 7, wherein:

said scheduling the terminal refers to scheduling the terminal in downlink or authorizing the terminal in uplink.

10. The method of claim 7, wherein:

said scheduling the terminal refers to scheduling the terminal in downlink or authorizing the terminal in uplink.

11. A device for scheduling terminals in a LTE system, located on the system side, said device comprising:

a judging module and a scheduling module;

said judging module is configured to judge, based on information acquired from the terminal, whether downlink scheduling information or uplink authorization information of a terminal in a measurement state of measurement gap is sent during the period of measuring the measurement gap, and to judge whether downlink scheduling feedback, uplink data feedback or uplink data corresponding to uplink authorization of said terminal is sent during the period of measuring the measurement gap; and to transfer the judgment result to said scheduling module;

wherein, said judging module is configured:

to further judge whether said downlink scheduling information is sent during the period of measuring the measurement gap when judging there is the downlink scheduling information of said terminal, and if yes, not to schedule said terminal now if no, to further judge whether the downlink scheduling feedback of said terminal is sent during the period of measuring the measurement gap, and if yes, not to schedule said terminal now if no, to schedule said terminal normally; or to further judge whether said uplink authorization information is sent during the period of measuring the measurement gap when judging there is the uplink authorization information of said terminal, and if yes, not to schedule said terminal now if no, to further judge whether either of the following information is sent during the period of measuring the measurement gap: the uplink data feedback of said terminal, the uplink data corresponding to the uplink authorization of said terminal, and if yes, not to schedule said terminal now if no, to schedule said terminal normally; or to further judge whether either of the downlink scheduling information or the uplink authorization information of said terminal is sent during the period of measuring the measurement gap when judging there is the downlink scheduling information and the uplink authorization information of said terminal, and if yes, not to schedule said terminal now if no, to judge whether any of the following information is sent during the period of measuring the measurement gap: the downlink scheduling feedback of said terminal, the uplink data feedback of said terminal, the uplink data corresponding to the uplink authorization of said terminal, and if yes, not to schedule said terminal now if no, to schedule said terminal normally;

said scheduling module is configured to schedule the terminal of which none of the following information is sent during the period of measuring the measurement gap according to the judgment result of said judging module: the downlink scheduling information, the uplink authorization information, the downlink scheduling feedback, the uplink data feedback, the uplink data corresponding to the uplink authorization.

12. The device of claim 11, further comprising:
a terminal information acquisition module configured to acquire information of the terminal which needs to be scheduled on current sub-frame.

13. The device of claim 12, wherein,
said judging module is also configured to judge whether the terminal which needs to be scheduled is in a measurement state according to the information of the terminal acquired by said terminal information acquisition module; and to judge whether the current measurement of said terminal is the measurement gap when the terminal is in the measurement state.

14. The device of claim 12, wherein,
said judging module is also configured to judge whether terminals which need to be scheduled on current sub-frame have been scheduled according to the information of the terminals acquired by said terminal information acquisition module;
said scheduling module is also configured to schedule directly the terminal which is in the measurement state but the current measurement is not the measurement gap, and the terminal which is not in the measurement state.

* * * * *